US006663281B2

(12) United States Patent
Aufrichtig et al.

(10) Patent No.: US 6,663,281 B2
(45) Date of Patent: Dec. 16, 2003

(54) X-RAY DETECTOR MONITORING

(75) Inventors: Richard Aufrichtig, Mountain View, CA (US); Paul R. Granfors, Sunnyvale, CA (US); Gerhard Brunst, Gross-Umstadt (DE); Kenneth S. Kump, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 133 days.

(21) Appl. No.: 09/682,591

(22) Filed: Sep. 25, 2001

(65) Prior Publication Data

US 2003/0058998 A1 Mar. 27, 2003

(51) Int. Cl.[7] .............................................. G01D 18/00
(52) U.S. Cl. ...................................... 378/207; 378/98.8
(58) Field of Search ................................ 382/128, 131, 382/132; 378/207, 19, 98, 98.8; 250/208.1

(56) References Cited

U.S. PATENT DOCUMENTS

| 4,996,413 | A | | 2/1991 | McDaniel et al. |
| 5,047,863 | A | | 9/1991 | Pape et al. |
| 5,272,536 | A | | 12/1993 | Sudo et al. |
| 5,657,400 | A | | 8/1997 | Granforls |
| 5,854,655 | A | | 12/1998 | Watanabe et al. |
| 6,296,387 | B1 | * | 10/2001 | Guillemaud ................. 378/207 |
| 6,415,063 | B1 | * | 7/2002 | Pourjavid ................... 382/275 |
| 6,488,409 | B1 | * | 12/2002 | Vafi et al. ................... 378/207 |

* cited by examiner

Primary Examiner—Harshad Patel
(74) Attorney, Agent, or Firm—McAndrews, Held & Malloy, Ltd.; Peter J. Vogel; Michael A. Dellapenna

(57) ABSTRACT

An x-ray system (14) including a source of x-rays (15) and a detector (22) monitors the detector with a control (36) that calibrates the detector during a calibration phase of operation and powers the detector during use phases of operation occurring at different times. A processor (28, 36) reads the data created by the pixel elements, analyzes the data and identifies pixel elements corresponding to data indicating defective pixel elements during the calibration phase of operation and during a predetermined portion of a plurality of use phases of operation.

19 Claims, 3 Drawing Sheets

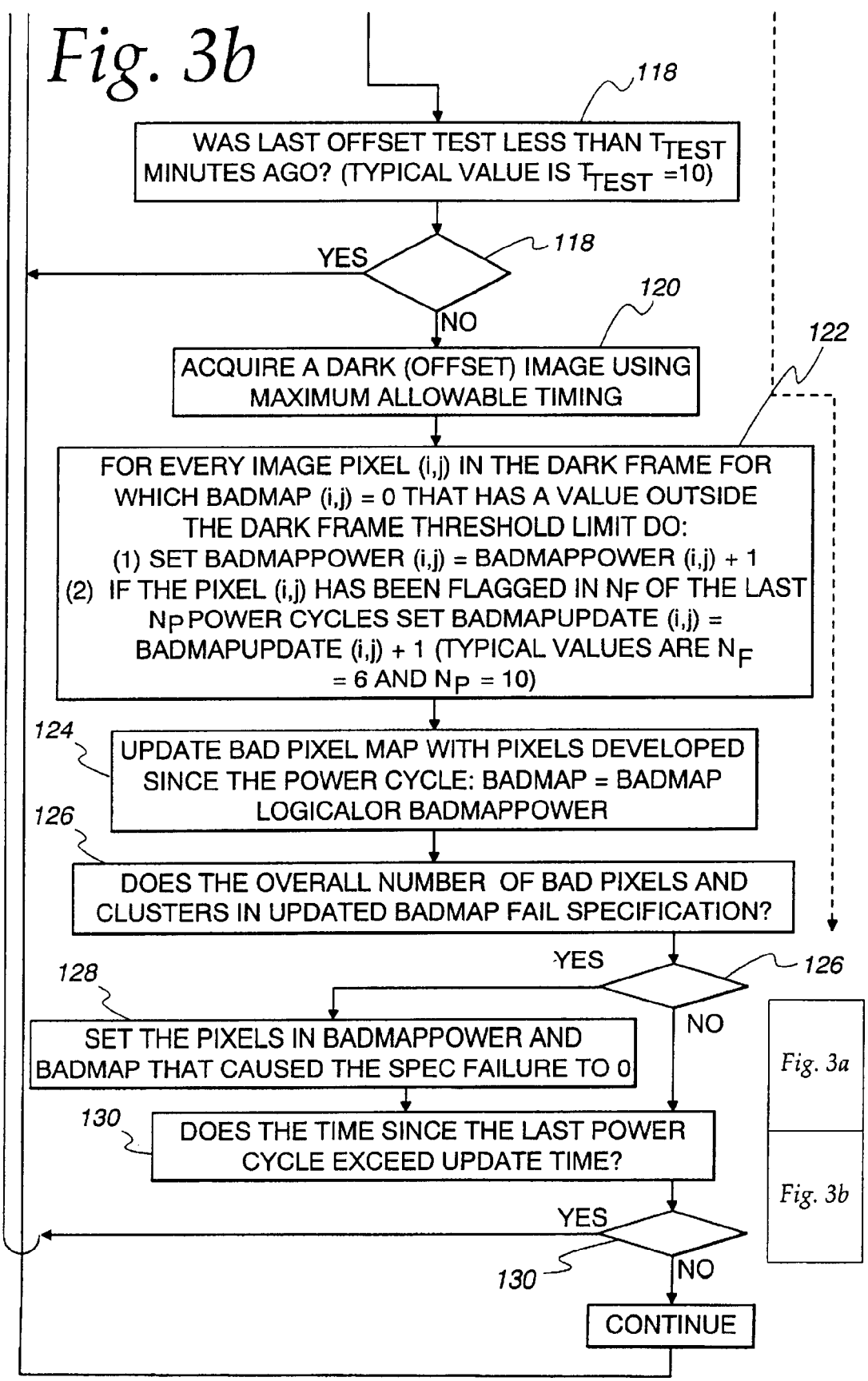

X-RAY DETECTOR MONITORING

BACKGROUND OF INVENTION

This invention relates to x-ray systems employing a detector and more specifically relates to monitoring and correcting such systems.

The introduction of new digital x-ray detectors presents a problem with respect to lost image information at locations containing defects within the detector. Defects are typically caused by bad pixel elements, which are pixel elements that are either not responding electrically or have a behavior that is statistically different from their surrounding pixel elements.

During calibration and setup of the digital detector methods exist to identify the location of such defective pixel elements. This is typically done by analyzing flat field images, which contain no structure, and searching for outlier pixel elements. These flat field images are obtained in one of two modes (1) "dark" or offset frames in which the imager is read without using x-rays, and (2) "light" or x-ray frames, in which an x-ray signal is applied prior to the read-out. Pixel elements identified during calibration are typically stored in a bad pixel map. Different methods exist to correct pixel elements identified in a bad pixel map prior to image display.

Under certain conditions defective pixel elements, which were not identified during the initial calibration may develop over time in the amorphous silicon detector. The present invention addresses the foregoing problems and provides a solution. In one embodiment, pixel element behavior is monitored, and the bad pixel map may be updated.

An amorphous silicon digital x-ray detector consists of an array of pixel elements (e.g. 2048×2048). Each element consists of a photodiode and an associated field effect transistor (FET). For the purpose of x-ray imaging a scintillator is coupled to the array to convert incident x-rays to light. The light produced by the scintillator is converted to electric charge and stored in the diodes. The charge is read out by activating the FETs associated with each diode.

Algorithms have been designed to analyze images acquired with a flat panel x-ray imager and detect bad pixel elements. These are pixel elements that do not respond electrically or have a behavior that is statistically different from their surrounding pixel elements. Often, this can be related to defects in the FET or diode structure in the array.

The result of these algorithms is to create an image map (bad pixel map) containing the locations of the defective pixel elements within the detector array. Patents in this area include: U.S. Pat. No. 5,657,400, which is directed to automatic identification and correction of bad pixels in a large area solid-state x-ray detector; U.S. Pat. No. 5,854,655, which is directed to a defective pixel detecting circuit of a solid state image pick-up device capable of detecting defective pixels; U.S. Pat. No. 5,272,536, which is directed to a dark current and defective pixel correction apparatus; U.S. Pat. No. 5,047,863, which is directed to a defect correction apparatus for solid state imaging devices including inoperative pixel detection; and U.S. Pat. No. 4,996,413, which is directed to reading data from an image detector.

In addition to detecting the defective pixel elements, some of these patents also describe methods of correcting the pixel prior to image display. Most correction methods rely on replacing the defective pixel with the value of its neighboring pixel or a linear combination of these. In addition some more advanced correction methods based upon the underlying image structure have been proposed in U.S. application Ser. No. 09/474,715, entitled "Correction Of Defective Pixels In A Detector" filed Dec. 29, 1999 under docket no. 15-XZ-4974 in the names of Aufrichtig, Xue and Kump and U.S. application Ser. No. 09/474,498, entitled "Correction Of Defective Pixels In A Detector Using Temporal Gradients" filed Dec. 29, 1999 under docket no. 15-XZ-5428 in the names of Aufrichtig, Xue and Kump.

SUMMARY OF INVENTION

The preferred embodiment is useful in an x-ray imaging system comprising a source of x-rays and a digital detector comprising pixel elements arranged in rows and columns for creating data suitable for generating an x-ray image of a portion of a patient. In such an environment, the detector may be monitored by calibrating the detector during a calibration phase of operation, powering the detector during use phases of operation occurring at different times, energizing the source of x-rays in an exposure mode of operation during the use phases of operation so that x-rays are transmitted to the detector, and inhibiting the source of x-rays in a dark mode of operation during the use phases of operation. The data created by the pixel elements is read and analyzed. The pixel elements are identified which correspond to data indicating defective pixel elements during the calibration phase of operation and during a predetermined portion of a plurality of the use phases of operation.

By using the foregoing techniques, x-ray detectors may be monitored with a degree of ease and accuracy previously unattainable.

DETAILED DESCRIPTION

Figure 1:
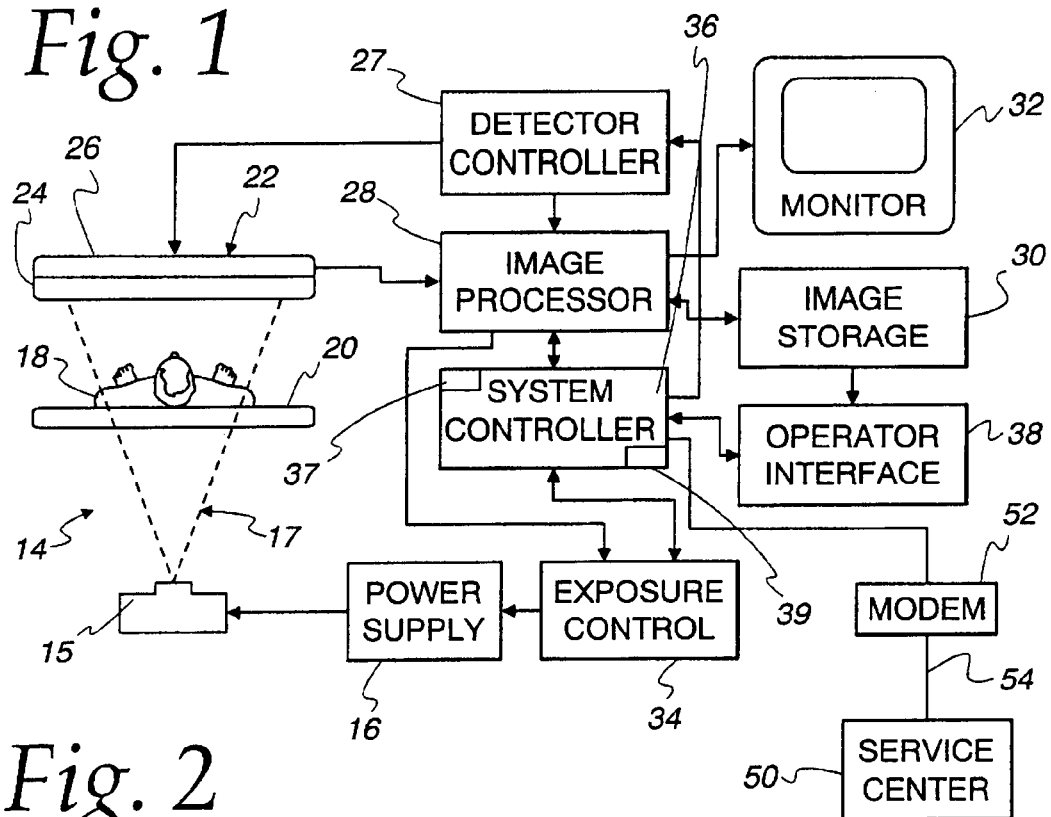
FIG. 1 is a schematic block diagram of a preferred form of x-ray system implementing the present invention and illustrating an exemplary image detector array.

Referring to FIG. 1, an X-ray system 14 includes an X-ray tube 15 which, when excited by a power supply 16, emits an X-ray beam 17. As illustrated, the X-ray beam is directed toward a patient 18 lying on an X-ray transmissive table 20. The portion of the beam which is transmitted through the table and the patient impinges upon an X-ray detector designated 22. The X-ray detector 22 comprises a scintillator 24 that converts the X-ray photons to lower energy photons in the visible spectrum. Contiguous with the scintillator 24 is a photo detector array 26, which converts the light photons into an electrical signal. A detector controller 27 contains electronics for operating the detector array to acquire an image and to read out the signal from each photo detector element.

The output signal from the photo detector array 26 is coupled to an image processor 28 that includes circuitry for processing and enhancing the X-ray image signal. The processed image then is displayed on a video monitor 32 and may be archived in an image storage device 30. The image processor 28 additionally produces a brightness control signal which is applied to an exposure control circuit 34 to regulate the power supply 16 and thereby the X-ray exposure.

The overall operation of the X-ray system 14 is governed by a system controller 36, which receives commands from the X-ray technician via an operator interface panel 38. Controller 36 includes a memory 37 and a processor 39.

Figure 2:
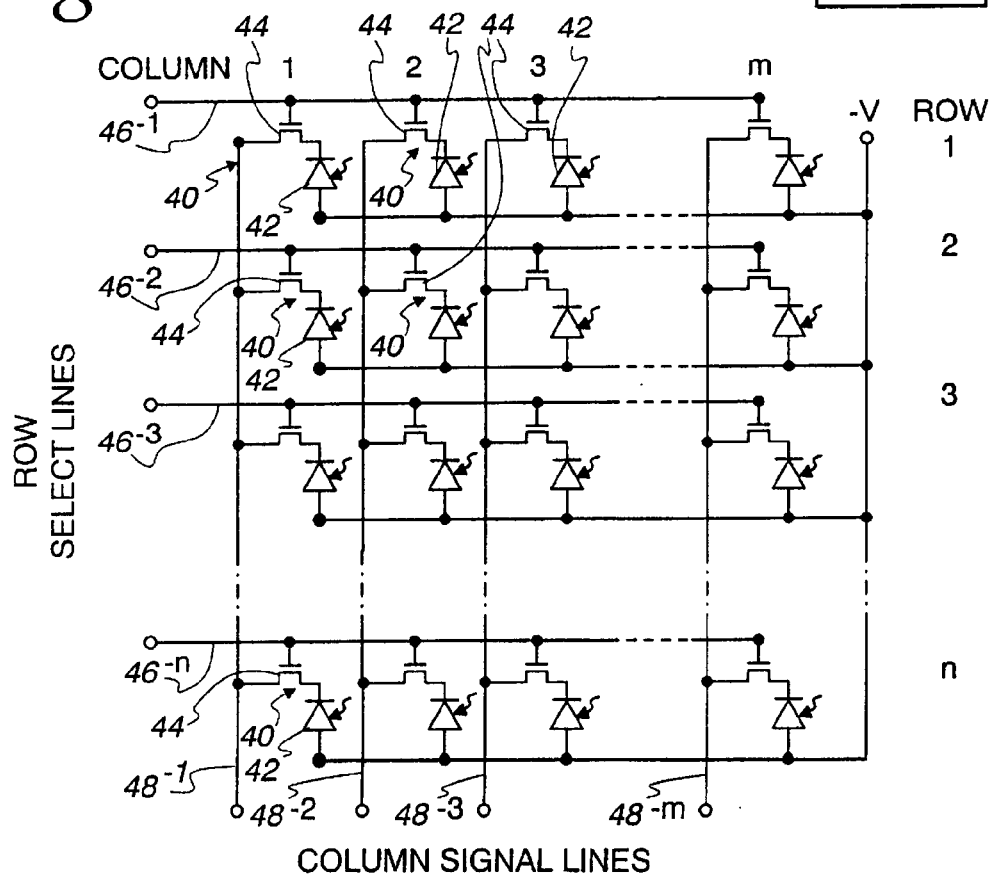
FIG. 2 is a schematic diagram of the image detector array shown in FIG. 1.

FIG. 2 illustrates the circuitry of the photo detector array 26, which is formed by a matrix of detector elements or pixel elements 40. The pixel elements 40 are arranged on an amorphous silicon wafer in a conventional two-dimensional array of m columns and n rows, where m and n are integers. For example, a typical high resolution X ray detector is an array of 1,000 to 4,000 rows and columns of elements.

Each pixel element 40 includes a photo diode 42 and a thin film transistor 44. The photo diodes 42 are fabricated from a large wafer area ensuring that the photo diode will intercept a sizeable portion of the light produced by the scintillator 24. Each photo diode 42 also has a relatively large capacitance that allows it to store the electrical charge resulting from the photon excitation.

The cathode of the photo diodes 42 in each column of the array is connected by the source-drain conduction path of the associated transistor 44 to a common column signal line ($48^{-1}$ through $48^{-m}$) for the column. For example the photo diodes 42 in column 1 are coupled to the first signal line $48^{-1}$. The anodes of the diodes in each row are connected in common to a source of a negative bias voltage (−v). The gate electrodes of the transistors 44 in each row are connected to a common row select line ($46^{-1}$ through $46^{-n}$,) such as line $46^{-1}$ for row 1. The row select lines and the column signal lines are coupled to the detector controller 27 and the column signal lines also are connected to the image processor 28.

In order to acquire an X ray image using the detector illustrated in FIG. 2, the system 14 may perform a variety of sequences. One exemplary sequence is as follows. Initially, the detector controller 27 connects all the column signal lines $48^{-1}$ through $48^{-m}$ to ground, and applies a positive voltage to all the row select lines $46^{-1}$ through $46^{-n}$. The positive voltage applied to the row select lines turns on the transistor 44 in each pixel element 40 placing a positive charge on the reverse biased photo diodes 42. Once the photo diodes have been fully charged, the detector controller 27 applies a negative voltage −V, which is more negative than the negative supply voltage (−V), to the row select lines. This negative biasing of the row select lines turns off the transistor 44 in each pixel element 40.

Then the detector 22 is exposed to a pulse of X-ray photons produced in a conventional manner by the system exciting tube 15 to generate a beam 17 of X-ray photons. The X-ray photons are converted to lower energy photons by the scintillator 24. When these lower energy photons strike the photo diodes 42 in the detector 26, the diodes conduct electricity and discharge a portion of their positive charge. The amount of the positive charge removed from a given photo diode 42 depends upon the amount of lower energy photons which strikes it, which in turn depends upon the intensity of the X-ray energy that strikes region of the scintillator 24 adjacent to the photo diode. Therefore, the amount of charge removed from the photo diode 42 in each pixel element 40 is a function of the X-ray intensity striking the corresponding region of the X-ray detector 22.

After the termination of the X-ray exposure, the residual charge in each photo diode 42 is sensed. To do so, the column signal line $48^{-1}$ through $48^{-m}$ for each detector array column is simultaneously connected to separate sensing circuits in the image processor 28. Any of several types of sensing circuits can be incorporated into the image processor 28. For example, the sensing circuit can measure the voltage across the photo diode, and therefore the amount of charge remaining on the photo diode. Alternatively, the sensing circuit can connect the associated column signal line $48^{-1}$ through $48^{-m}$ to ground potential and measure the amount of charge that is required to replace the charge removed by the X ray exposure.

For maximum image resolution, the photo diode charges are sensed a row at a time by the detector controller 27 sequentially applying the positive voltage to each of the row select lines. When a row select line is positively biased, the detector array transistors 44 connected to that row select line are turned on thereby coupling the associated photo diodes 42 in the selected row to their column signal lines $48^{-1}$ through $48^{-m}$.

The problem that is being solved with the preferred embodiment relates to the situation in which the pixel element behavior within the image detector changes over time, causing individual pixel elements to become defective. For example diode leakage may evolve in a pixel element over time (on the order of hours) causing a significant change in the pixel element response. Similarly, field effect transistor (FET) leakage may also develop in individual pixel elements over a number of hours, causing non-linearity in the pixel element behavior. These types of leakage effects are typically reset when the detector power is cycled, but often develop again in the same pixel elements at later instances. These types of defects are typically never detected during calibration, since that often occurs within a short time after powerup. A method is therefore needed for continuous monitoring of the pixel elements in the detector, so that potential defective pixel elements may be added to the bad pixel map.

The preferred embodiment includes a method for unassisted monitoring and updating of the bad pixel map. The method consists of acquiring dark images when the detector is not used for clinical (patient) applications. Dark images do not require the use of x-ray, and can be acquired unassisted as a background operation.

The preferred embodiment utilizes 3 bad pixel maps.

BadMapOrig is obtained after a standard calibration of the detector. For example, it can be an ASCII or binary file in memory 37 containing row and column indices for all bad pixel elements detected during the calibration. Calibration of the detector is a task that occurs at intervals on the order of months (typical 6 or 12 months).

BadMapPower is obtained during standard detector use. It is reset between each power cycle of the detector. It contains the location of pixel elements that were not detected during the calibration, but have drifted in the dark (offset) image after the last power reset. The BadMapPower map also is stored in memory 37.

BadMapUpdate is obtained during standard detector use. It represents pixel elements that were not detected during the calibration but frequently (e.g. 6 out of 10 times) show drift after a detector power cycle. This pixel map is also updated if a power cycle has not occurred within a specified time interval (e.g. 24 hours) and is stored in memory 37.

The values in the foregoing three maps correspond to pixel elements in detector 22.

Figure 3A:
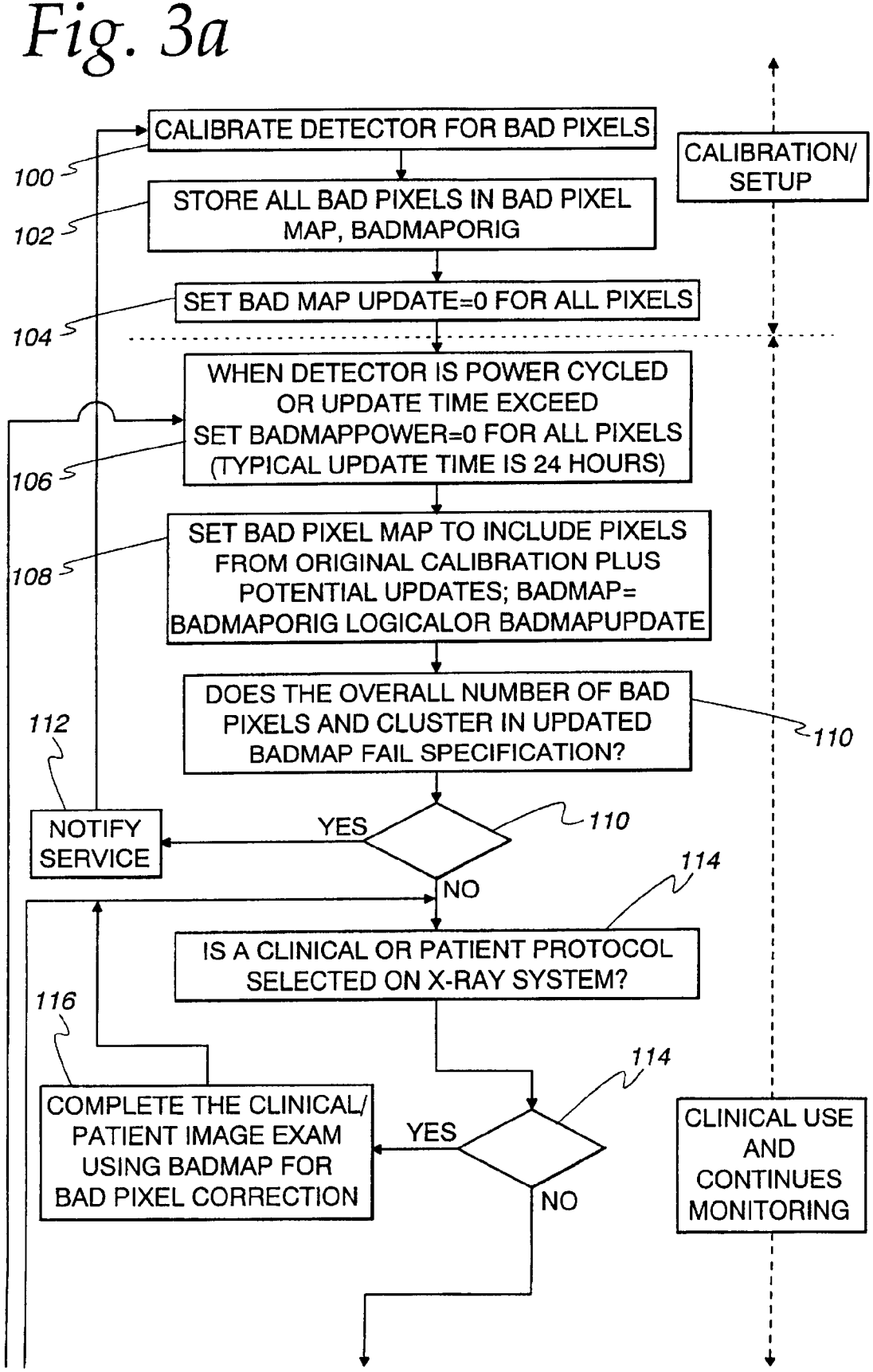
FIG. 3 is flow diagram illustrating a preferred mode of operation of the apparatus shown in FIGS. 1 and 2.

The flow diagram in FIG. 3 illustrates how these bad pixel maps are obtained. Briefly, the method consists of acquiring dark images in-between patient exams. For example, a dark image may be acquired every 10 minutes. To increase the sensitivity to diode lag, the dark image should be acquired with the longest available integration time. This integration time interval (in the range of 2–20 sec) may be longer than maximum clinically used timing (for example 2–5 sec). Pixel elements that have dark values outside the specified level are marked as bad in the BadMapPower pixel map. Within a given power cycle, the bad pixel map is a combination of the calibration map (BadMapOrig) and BadMapPower. After pixel elements are added to the bad map, one must check to insure that the detector meets specifications with respect to the overall number of bad pixel elements, and combinations of those (clusters). The standard calibration check routine can be used for this purpose. If there is a specification failure during a power cycle run, the pixel elements causing the failure are reset. The number of times a pixel element is included in BadMapPower is monitored, and when a specified frequency of occurrence (e.g. 60% of the time) is exceeded it is included in the BadMapUpdate record. If an update of the bad pixel map by BadMapUpdate result in a specification failure, service is notified, and the detector should be recalibrated. The BadMapUpdate is reset after a detector calibration.

The bad pixel map which is applied for any given image is the "Logical Or" of BadMapOrig and BadMapUpdate. These identified pixel elements then go through the "normal" bad pixel element masking process, which is typically interpolation of the missing value from the neighboring good pixel elements.

The notification to service can be an automatic dial-up via the system modem, or simply a screen alert to the user to call service.

FIG. 3 illustrates this bad pixel element monitoring strategy. In the bad pixel maps, a zero (0) value indicates a good pixel element, while a non-zero value indicates a bad pixel element. A "Logical Or" operation results in a value of zero (0) only when both input arguments are zero, otherwise it results in a value of one (1).

Referring to FIG. 3, in step 100, controller 36 calibrates detector 22 in a well-known manner. In step 102, processor 39 stores in map BadMapOrig in memory 37 an identification of all defective or bad pixel elements located by reading and analyzing data from detector 22 during calibration. In step 104, processor 39 sets the values corresponding to all pixel elements in map BadMapUpdate to a zero value. Steps 100-104 are performed during a calibration setup.

In step 106, processor 39 sets the values corresponding to all pixel elements in map BadMapPower to a zero value when detector is power cycled by controller 36 or when an update time period, such as 24 hours, is exceeded. Controller 36 puts system 14 through a power cycle from time to time as desired by a user who starts and stops the system through interface 38. In step 108, processor 39 sets the values corresponding to all pixel elements in map BadMap equal to the corresponding values in map BadMapOrig logically OR'd with the corresponding values in map BadMapUpdate. In step 110, processor 39 determines whether the overall number of defective pixel elements and clusters of pixel elements indicated by the values in map BadMap fail to fall within a specification tolerance. If so, service is notified in step 112. If not, in step 114, controller 36 determines whether a clinical or patient protocol has been selected through operator interface 38. If so, in step 116, a complete clinical/patient image exam is performed using BadMap for bad pixel correction. During the image exam, x-ray tube 15 is energized by control 34 during an exposure mode of operation. If not, in step 118, processor 39 determines whether the last offset test occurred less than a predetermined time period, such as 10 minutes. If so, the program returns to step 114. If not, in step 120, processor 39 acquires a dark (offset) image frame of data by reading the values of the pixel elements in detector 22 using a maximum allowable timing. The reading is accomplished through processor 28. The dark image data is obtained while x-ray tube 15 is turned off by controllers 34 and 36.

In step 122, if the pixel element in the dark image frame obtained in step 120 has a value outside a dark frame threshold limit, processor 39 sets a corresponding bit in map BadMapPower to a one value. If the pixel has been flagged in Nf of the last Np power cycles, then the corresponding bit in map BadMapUpdate is set to a one value. A typical value of Nf is 6 and a typical value of Np is 10. In step 124, the values in map BadMap are set equal to the corresponding values in map BadMap logically OR'd with the corresponding values of map BadMapPower. In step 126, processor 39 determines whether the overall number of defective pixel elements and clusters of pixel elements identified in map BadMap fall outside a tolerance of a specification. If so, in step 128, the values in map BadMap Power and map BadMap that caused the failure to fall within the specification are set to a zero value. If not, in step 130, controller 36 determines whether the time period since the last power cycle exceeds a predetermined update time period. If so, the program returns to step 106. If not, the program continues with step 114. Steps 106 through 130 illustrate a use phase of operation of system 14.

The preferred embodiment offers a number of advantages. The monitoring may proceed in an uninterrupted fashion as a background operation for the customer. In the case of new bad pixels, these are added to the bad pixel map, so that the image is corrected appropriately. The detector is also monitored to insure that it remains within required specifications for bad pixels. If the detector fails specifications, a service center 50 is notified through a modem 52 and a network 54. The message transmitted to the service center 50 by controller 36 reports the data indicating defective pixel elements and may identify the defective pixel elements.

With this methodology undetected bad pixels by the calibration are identified and appropriately corrected.

Those skilled in the art will recognize that the preferred embodiments may be altered and modified without departing from the true spirit and scope of the invention as defined in the accompanying claims.

What is claimed is:

1. In an x-ray imaging system comprising a source of x-rays and a digital detector comprising pixel elements arranged in rows and columns for creating data suitable for generating an x-ray image of a portion of a patient, apparatus for monitoring the detector comprising:

a control arranged to calibrate the detector during a calibration phase of operation,
power the detector during use phases of operation occurring at different times,
energize the source of x-rays in an exposure mode of operation during the use phases of operation so that x-rays are transmitted to the detector, and
inhibit the source of x-rays in a dark mode of operation during the use phases of operation; and a processor arranged to
read the data created by said pixel elements,
analyze the read data,
identify pixel elements corresponding to data indicating defective pixel elements during the calibration phase of operation and during a predetermined portion of a plurality of the use phases of operation, and read the data during the dark mode of operation and to analyze the read data by determining whether the data values are within a range of predetermined levels.

2. Apparatus, as claimed in claim 1, wherein the apparatus further comprises a memory and wherein the processor is arranged to store the identified pixel elements in the memory.

3. Apparatus, as claimed in claim 1, wherein the processor reads the data during the dark mode of operation.

4. Apparatus, as claimed in claim 1, wherein the processor is arranged to identify pixel elements corresponding to data indicating defective pixel elements during the use phase of operation.

5. Apparatus, as claimed in claim 1, wherein the processor identifies pixel elements corresponding to data indicating defective pixel elements during any calibration phase of operation, the current use phase of operation and during a predetermined portion of prior use phases of operation.

6. Apparatus, as claimed in claim 5, wherein the processor uses the identified pixel elements to correct data obtained during exposure mode of operation to aid the generation of the x-ray image.

7. Apparatus, as claimed in claim 1, wherein the system comprises a memory and wherein the processor is arranged to:
  store in the memory a first map identifying pixel elements corresponding to data indicating defective pixel elements during the most recent calibration phase of operation;
  store in the memory a second map identifying pixel elements corresponding to data indicating defective pixel elements during the current use phase of operation; and
  store in the memory a third map identifying pixel elements corresponding to data indicating defective pixel elements during a predetermined portion of a plurality of use phases of operation occurring prior to the current use phase of operation.

8. Apparatus, as claimed in claim 1, wherein the processor is arranged to periodically read the data during the use phase of operation.

9. In an x-ray imaging system comprising a source of x-rays and a digital detector comprising pixel elements arranged in rows and columns for creating data suitable for generating an x-ray image of a portion of a patient, a method of monitoring the detector comprising:
  calibrating the detector during a calibration phase of operation;
  powering the detector during use phases of operation occurring at different times;
  energizing the source of x-rays in an exposure mode of operation during the use phases of operation so that x-rays are transmitted to the detector;
  inhibiting the source of x-rays in a dark mode of operation during the use phases of operation;
  reading the data created by said pixel elements during a dark mode of operation;
  analyzing the read data by determining whether the data values read during the dark mode of operation are within a range of predetermined levels; and
  identifying pixel elements corresponding to data indicating defective pixel elements during the calibration phase of operation and during a predetermined portion of a plurality of the use phases of operation.

10. A method, as claimed in claim 9, and further comprising storing the identified pixel elements.

11. A method, as claimed in claim 9, wherein said reading comprises reading the data during the dark mode of operation.

12. A method, as claimed in claim 9, wherein said identifying comprises identifying pixel elements corresponding to data indicating defective pixel elements during the use phase of operation.

13. A method, as claimed in claim 9, wherein said identifying comprises identifying pixel elements corresponding to data indicating defective pixel elements during any calibration phase of operation, the current use phase of operation and during a predetermined portion of prior use phases of operation.

14. A method, as claimed in claim 13, and further comprising using the identified pixel elements to correct data obtained during exposure mode of operation to aid the generation of the x-ray image.

15. A method, as claimed in claim 9, and further comprising:
  storing a first map identify pixel elements corresponding to data indicating defective pixel elements during the most recent calibration phase of operation;
  storing a second map identify pixel elements corresponding to data indicating defective pixel elements during the current use phase of operation; and
  storing a third map identify pixel elements corresponding to data indicating defective pixel elements during a predetermined portion of a plurality of use phases of operation occurring prior to the current use phase of operation.

16. A method, as claimed in claim 9, wherein said reading comprises reading the data during the use phase of operation approximately every 10 minutes.

17. A method, as claimed in claim 9, and further comprising contacting a service center and reporting the data indicating defective pixel elements.

18. In an x-ray imaging system comprising a source of x-rays and a digital detector comprising pixel elements arranged in rows and columns for creating data suitable for generating an x-ray image of a portion of a patient, apparatus for monitoring the detector comprising:
  a memory;
  a control arranged to
  calibrate the detector during a calibration phase of operation,
  power the detector during use phases of operation occurring at different times,
  energize the source of x-rays in an exposure mode of operation during the use phases of operation so that x-rays are transmitted to the detector, and
  inhibit the source of x-rays in a dark mode of operation during the use phases of operation; and
  a processor arranged to
  read the data created by said pixel elements,
  analyze the read data,
  identify pixel elements corresponding to data indicating defective pixel elements during the calibration phase of operation and during a predetermined portion of a plurality of the use phases of operation,
  store in the memory a first map identifying pixel elements corresponding to data indicating defective pixel elements during the most recent calibration phase of operation, store in the memory a second map identifying pixel elements corresponding to data indicating defective pixel elements during the current use phase of operation, and store in the memory a third map identifying pixel elements corresponding to data indicating defective pixel elements during a predetermined portion of a plurality of use phases of operation occurring prior to the current use phase of operation.

19. In an x-ray imaging system comprising a source of x-rays and a digital detector comprising pixel elements arranged in rows and columns for creating data suitable for generating an x-ray image of a portion of a patient, a method of monitoring the detector comprising:

calibrating the detector during a calibration phase of operation;

powering the detector during use phases of operation occurring at different times;

energizing the source of x-rays in an exposure mode of operation during the use phases of operation so that x-rays are transmitted to the detector;

inhibiting the source of x-rays in a dark mode of opertion during the use phases of operation;

reading the data created by said pixel elements;

analyzing the read data;

identifying pixel elements corresponding to data indicating defective pixel elements during the calibration phase of operation and during a predetermined portion of a plurality of the use phases of operation;

storing a first map identify pixel elements corresponding to data indicating defective pixel elements during the most recent calibration phase of operation;

storing a second map identify pixel elements corresponding to data indicating defective pixel elements during the current use phase of operation; and storing a third map identify pixel elements corresponding to data indicating defective pixel elements during a predetermined portion of a plurality of use phases of operation occurring prior to the current use phase of opertion.

* * * * *